March 31, 1970     H. A. McKEE ET AL     3,503,389

VIBRATION INDUCING APPARATUS AND METHOD

Filed June 12, 1967     4 Sheets-Sheet 1

INVENTORS.
HERBERT A. McKEE
CHARLES E. KENSIL
WALTER B. UDELL

BY Walter B. Udell
ATTORNEY

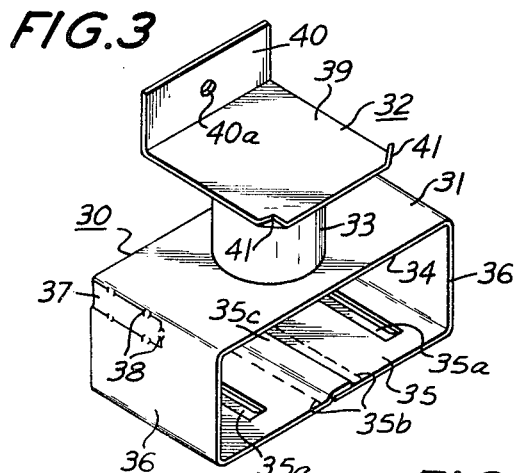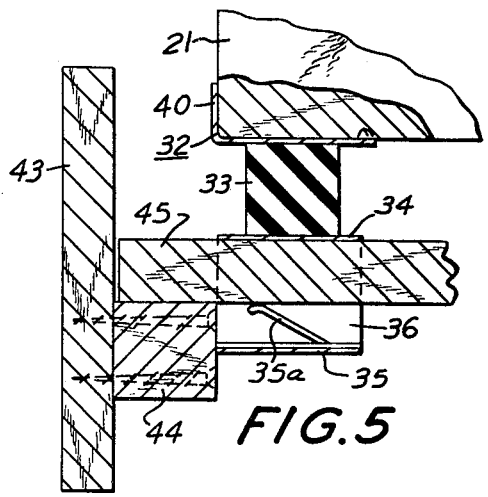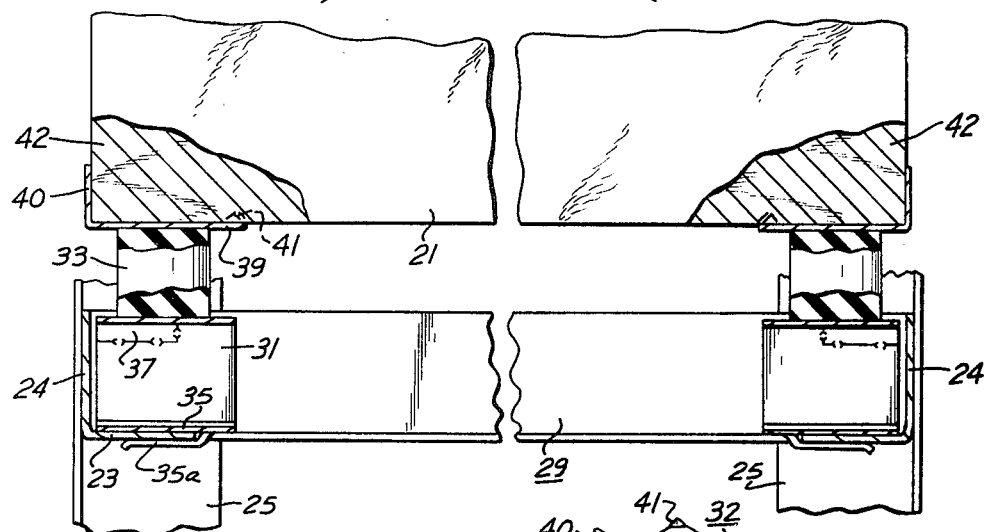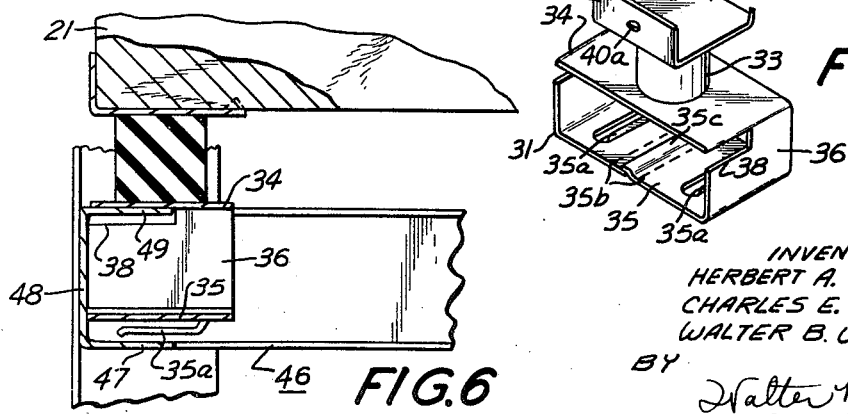

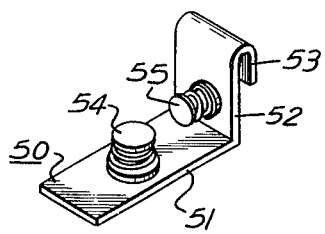
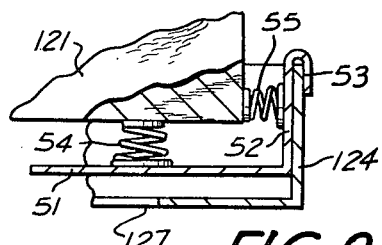
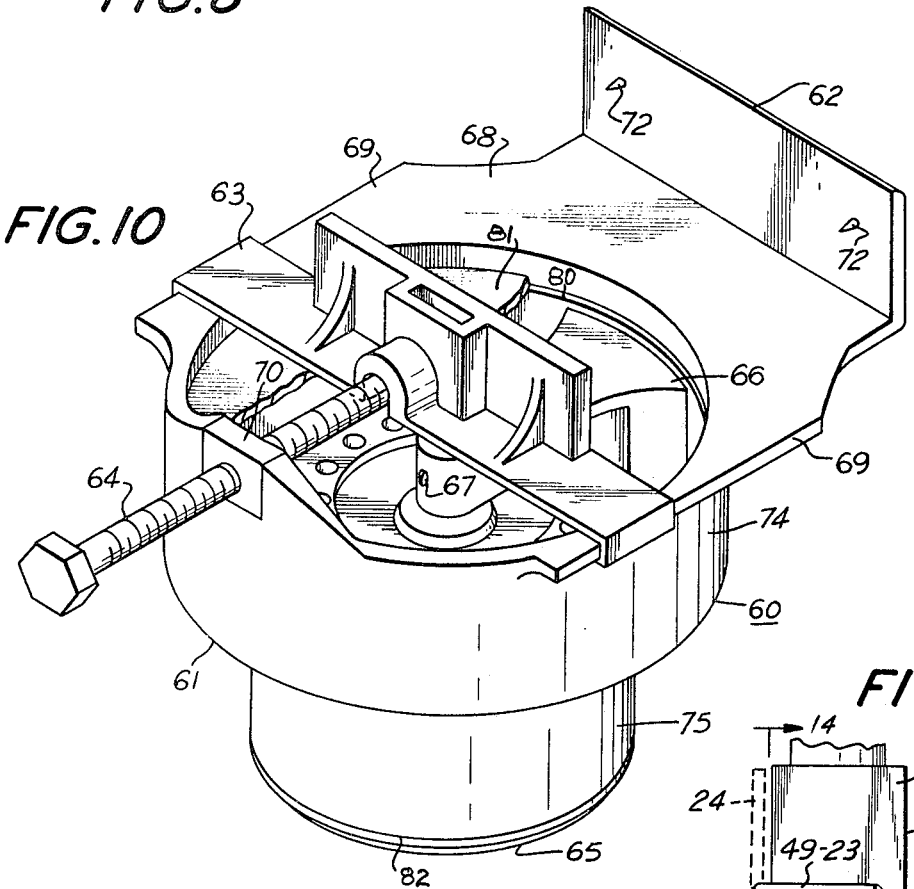
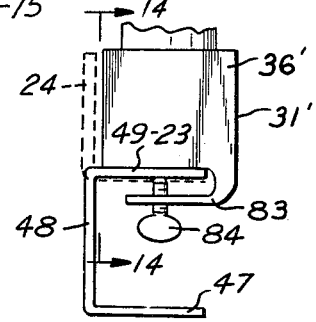
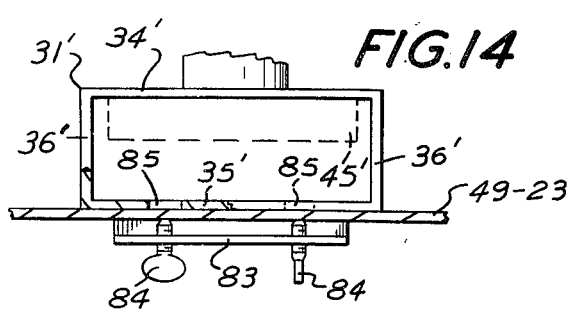

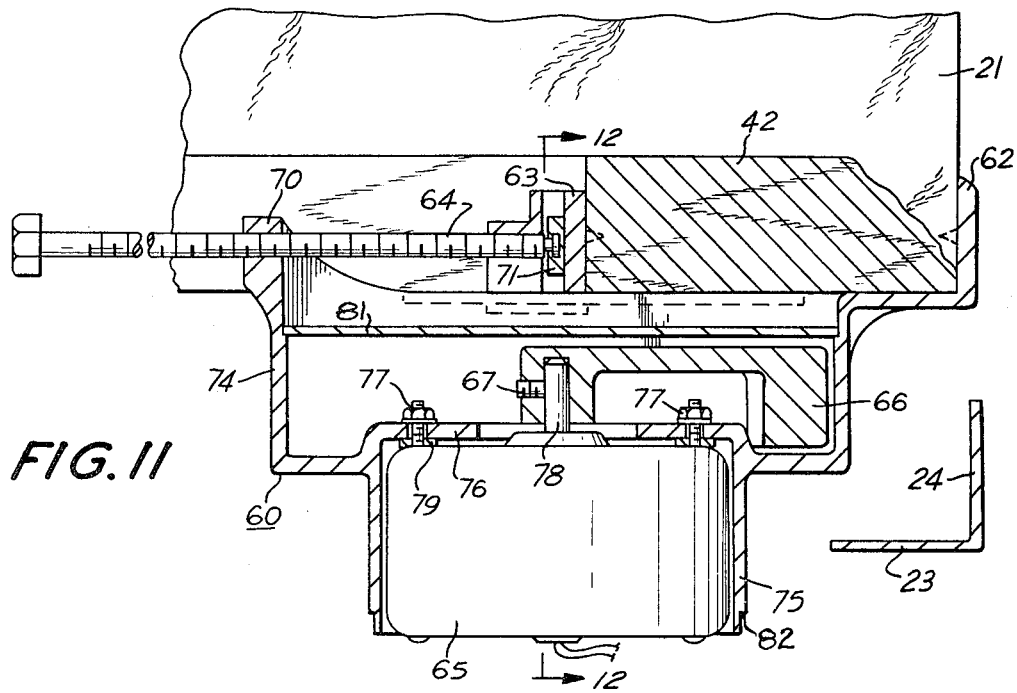
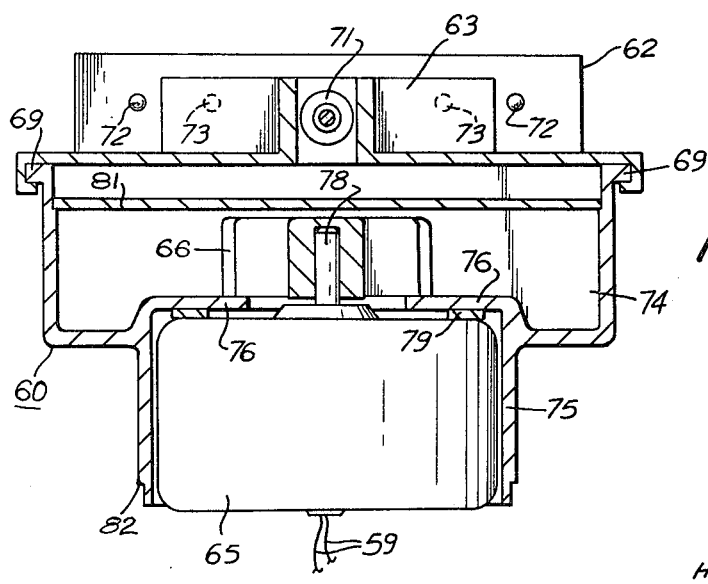

United States Patent Office 3,503,389
Patented Mar. 31, 1970

3,503,389
VIBRATION INDUCING APPARATUS AND METHOD
Herbert A. McKee, 463 Park Ave., Collingswood, N.J. 08108, and Charles E. Kensil, 719 E. Ontario St. 19134, and Walter B. Udell, 8527 Castor Ave. 19152, both of Philadelphia, Pa.; said McKee, Kensil and Udell assignors to said McKee, Kensil and Udell
Filed June 12, 1967, Ser. No. 645,454
Int. Cl. A61h 1/00
U.S. Cl. 128—33          21 Claims

ABSTRACT OF THE DISCLOSURE

A plurality of resilient supports or floats are interposed between a body support structure such as the box spring of a bed and the bed frame to float the box spring and mattress, and an electrically energizable vibrator is rigidly clamped to the box spring base to impart vibrations to the entire box spring and mattress when energized. The positioning of the floats and vibrator and the vibratory characteristics of each affect the vibrational amplitude and direction generated at different points on the support structure. Optimum general usage combination is provided by two floats on each side of the box spring end-spaced inward with the vibrator clamped to one side of the box spring base between the floats and closer to the foot end.

---

This invention is directed toward producing a feeling of well-being in the body by improving the blood circulation and relaxing the muscles.

In the past, devices having the same object in mind have been developed in various forms such as pads or cushions including a vibrator internally housed, devices for clamping onto various parts of the bed frame and mechanically engaging the mattress of the bed, vibrating structures built inside of mattresses or connected to the springs of a box spring, and even more complicated structures including large numbers of vibrator motor systems. All of these known devices have disadvantages of one type or another. For example, some devices use electrical brush motors and have been known to start fires in the bedding as a result of sparking occurring at the brushes. The devices which are built into spring and mattress constructions are comparatively expensive and produce localized effects or hot-spots due to their connection to only a few coil springs in the spring or mattress. Other types are clamped or otherwise attached to the bed frames and are generally unsightly and frequently mar the bedsteads.

All of these devices which are in the nature of attachments or auxiliary devices, and even some of those expensive types which are specially designed treatment structures, cause vibration transmission through the legs of the bed frame to the floor of the room, such vibrations being transmitted through the structural parts of the building and being clearly audible at considerable distances from the source of vibration generation. Some types which utilize high speed brush motors generate an audible low-pitched vibration which is transmitted into the walls of the room. Both of these forms of vibration are very annoying and pose a particular problem when these devices are installed in the rooms of hotels and motels since the annoying vibrations may be heard by guests as far as four or five rooms away from that in which the apparatus is being used.

The apparatus according to the present invention is characterized by none of these undesirable qualities. Accordingly, it is a primary object of our invention to provide a vibration apparatus of the auxiliary or attachment type which produces substantially uniform vibration of the box spring and mattress of a bed while at the same time preventing transmission of any vibrations whatever to the bed frame or floor and walls of the room, and is silent in operation.

Another object of our invention is to provide an apparatus as aforesaid which utilizes a floating suspension by means of which a box spring and mattress may be quickly and easily resiliently supported by the bed frame to provide a floating suspension which is operative even when the vibration inducing apparatus is quiescent.

Yet a further object of our invention is to provide a novel apparatus of the type described in which the apparatus providing the floating suspension for the box spring and mattress has three degrees of freedom of movement, and wherein the vibration generating part of the apparatus is operatively coupled to the suspension system to produce several modes of vibration simultaneously throughout the box spring and mattress.

Still another object of our invention is to provide an apparatus as aforesaid which may be quickly and easily attached to and detached from a bed with no special tools and without tearing or marring any part of the bed structure, the system when installed being in most cases completely invisible.

The foregoing and other objects of our invention will become clear from reading the following specification in conjunction with an examination of the appended drawings, wherein:

FIGURE 3 is a perspective view of one of the vibration isolating float devices;

FIGURE 4 is a vertical sectional view through the bed structure of FIGURE 1, fragmented and on an enlarged scale, as would be seen when viewed along the line 4—4 of FIGURE 1;

FIGURE 5 is a fragmentary view of the float structure of FIGURE 3 operatively installed on a slat type bed instead of the angle frame bed of FIGURE 4;

FIGURE 6 is a showing similar to FIGURE 5 and FIGURE 4 but with the vibration isolating float installed on a bed frame of the channel type;

FIGURE 7 is a perspective view of the vibration isolating float of FIGURE 3 taken from the rear end and with the side knockouts removed for use as shown in FIGURE 6;

FIGURE 8 is an alternate form of vibration isolating float, and FIGURE 9 illustrates this form of float installed on an angle frame bed of the type shown in FIGURE 4;

FIGURE 10 is a perspective view of the vibration inducing unit including the motor and clamp structure;

FIGURE 11 is a vertical sectional view on an enlarged scale as would be seen when viewed along the line 11—11 of FIGURE 1, and illustrates the vibration unit of FIGURE 10 operatively clamped to the frame of the box spring;

FIGURE 12 is a vertical sectional view through the vibration unit of FIGURE 10 as would be seen when viewed along the line 12—12 of FIGURE 11;

FIGURE 13 is a side view of the lower box of a modified form of vibration isolating float; and FIGURE 14 is a front view of the modified form of float shown in FIGURE 13 as would be seen when viewed along the line 14—14 of FIGURE 13.

In the several figures, like elements are denoted by like reference characters.

Figure 1:
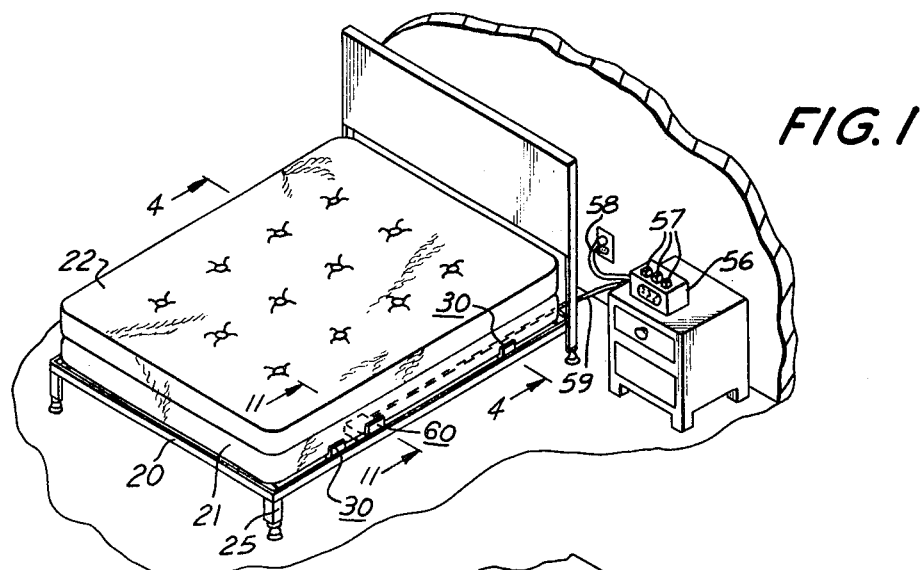
FIGURE 1 is a perspective view of a bed with the apparatus according to the invention attached thereto.
Figure 2:
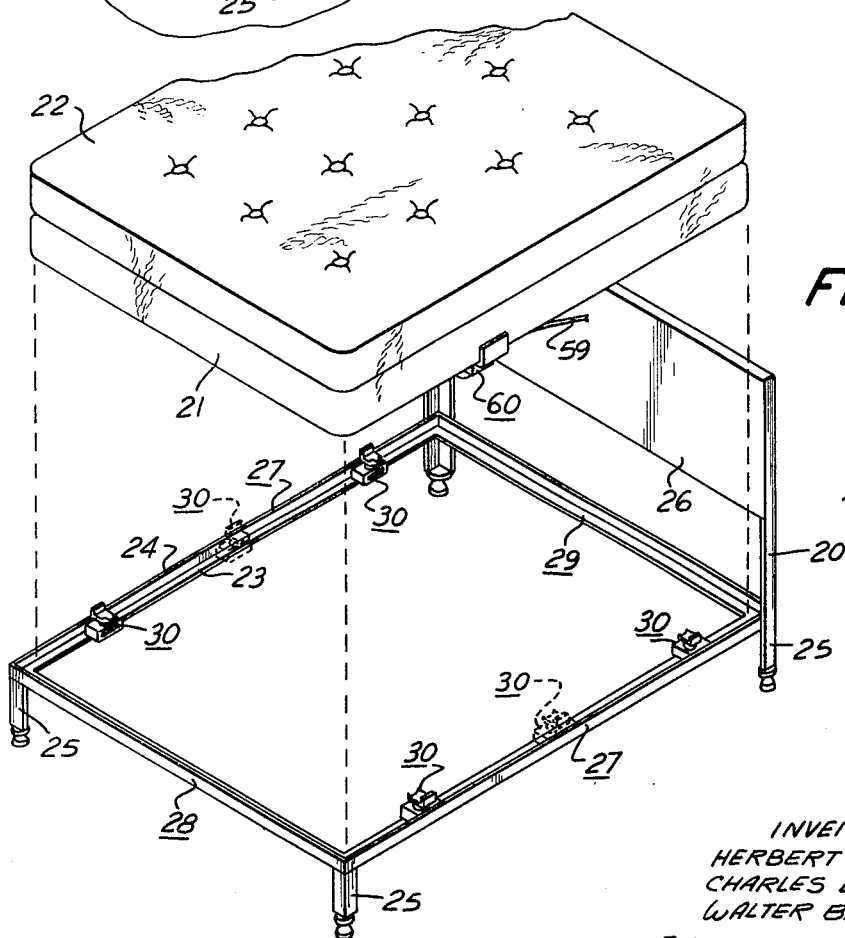
FIGURE 2 is a partially exploded view of FIGURE 1 on a somewhat enlarged scale showing the vibrator as being clamped to the box spring and with the isolation floats supported by the bed frame.

As best seen in FIGURES 1 and 2, the system according to the invention is used in conjunction with a bed having a frame 20, box spring 21, and a mattress 22. The frame 20 as best seen from FIGURES 2 and 4, has a horizontal rectangular perimeter frame formed of a steel angle with horizontally inwardly extending legs 23 and vertically extending legs 24. The lower perimetral edge of the box spring 21 in normal bed usage is disposed flatwise downward upon the horizontal legs 23 of the bed frame angles and within the confines of the vertical legs 24. The mattress 22 of course rests on the box spring in the usual manner. The remainder of the bed frame 20 includes the legs 25 and a headboard 26.

Seated on the horizontal legs 23 of the bed frame side-rails 27 and end-spaced inward from the foot-rail 28 and head-rail 29 are four vibration isolating floats designated generally as 30, two floats being supported by each side-rail 27 to form a four-point suspension for the box spring and mattress. Each of the floats, as best seen in FIGURE 3, includes a lower box 31 in the form of an open-ended rectangular tube, an L-shaped upper anchor plate 32, and an intervening cylindrical resilient support 33 having its lower end bonded to the upper surface of the box 31 and its upper surface bonded to the under-side of the anchor plate 32.

The lower box 31 has an upper wall 34, a lower wall 35 and a pair of opposite side walls 36 joining the upper and lower walls. Each of the side walls 36 is formed with a rectangular knock-out 37 defined by the holding lines 38. The area of the knock-out 37 extends inward from one end of the side wall 36 immediately adjacent to the upper wall 34 and inward for more than half of the length of the lower box as measured in the direction of the tubular axis. The knock-outs 37 are offset only sufficiently to enable them to be broken out when required, as will be subsequently described, but to normally function as part of the load bearing side wall 36.

The lower wall has punched out of and downwardly offset therefrom a pair of laterally spaced detenting clip fingers 35a which extend substantially parallel to the side walls 36 with the clip fingers free ends toward the end of the box 31 formed with the knock-outs 37 and with the hinges of the fingers 35a toward the opposite end. When used with an angle frame in the manner shown in FIGURE 4 the center section of the lower wall 35 is superfluous and may be eliminated between the dotted lines 35b including the weldment 35c.

The L-shaped anchor plate 32 includes a platform leg 39 disposed substantially horizontally, and a vertically upwardly turned retainer leg 40 having a hole 40a therethrough, the plane of the retainer leg 40 being substantially orthogonal to the tubular axis of the lower box 31. The corners of the horizontal platform leg 39 of the anchor plate 32 at the opposite end from the retainer leg 40 are turned upward to form a pair of prongs 41.

As best seen from the showing of FIGURE 4, each of the floats 30 is supported on the bed frame side-rail with the lower wall 35 and clip fingers 35a of the float lower box 31 respectively seated flatwise downward upon and engaged under the horizontal leg 23 of the side-rail so that the retainer leg 40 of the float anchor plate 32 is disposed parallel to and spaced upwardly above the vertical leg 24 of the bed frame side-rail 27. The box spring 21 includes a perimetrally extending lower wooden frame 42 which forms the box spring base, the width of the wood forming this frame being usually on the order of between two inches and four and a half inches in width. Box springs are of standard sizes and the bed frames 20 are constructed to just accommodate the wooden base of the box spring with substantially no lateral play. Many bed frames of this general type formed from steel angle are width-wise adjustable by virtue of utilizing split and overlapped foot rails and head rails.

Because of the relationship of the box spring base to the bed frame side-rails, when the floats 30 are positioned on the bed frame side-rails 27 as illustrated, the wooden base 42 of the box spring 21 is seatable downward on the horizontal platform legs 39 of the floats 30 with the retainer legs 40 of the float anchor plate disposed flatwise against the side of the box spring base. An easily removable small nail or screw may be inserted horizontally into the box spring base through the hole 40a in the retainer leg 40 to insure against vertical separation of the box spring and float. The weight of the box spring causes the platform leg prongs 41 to penetrate upward into the wood of the box spring base 42 to thereby prevent any relative lateral movement between the box spring base and the anchor plate of the float. The vertical legs 24 of the bed frame side-rails 27 prevent any outward shifting of the lower box 31 of the floats 30 so that the entire body support system consisting of the box spring 21 and mattress 22 is resiliently supported on the floats 30 and held captive in the bed frame 20.

The lower box 31 and the anchor plate 32 of the floats 30 may be made of any suitably strong material such as steel, while the cylindrical resilient supports 33 may suitably be made of rubber.

The float 30 as illustrated in FIGURES 3 and 7 is intended to be a universal type device suitable for use with substantially all bed frames in common use. FIGURE 5 illustrates the manner of using the float 30 with the widely encountered wooden bed frame having side boards 43 to the inside of which are fixedly secured side-rails 44 which support a plurality of transversely extending slats 45. For this type of installation, the box spring and matrices are first removed and each end of the head and foot slats is lifted so that the float 30, after turning the clip fingers upward into the box 31, may be placed on the slat by projecting the end of the slat through the open tubular cross section of the lower box 31 with the anchor plate retainer leg 40 disposed outwardly toward the inner face of the bed frame side board 43. With the slats 45 again disposed downward upon their supporting side-rails 44, the upper wall 34 of the float lower box 31 is seated flatwise downward upon the upper surface of the slat 45, and the clip fingers 35a are pressed upward into engagement with the underside of the slat 45. The box spring 21 is now placed in position in the previously described manner.

While bed frames of the types shown in FIGURES 4 and 5 constitute the majority of those in general use, there are also an appreciable number of bed frames similar to that of FIGURE 2 but employing U-shaped channel members instead of the L-shaped angle members shown in FIGURE 4. The channel type bed frame is illustrated in FIGURE 6 from which it will be seen that the channel members are utilized to provide a lower horizontal wall 47, a vertical outer wall 48 and an inwardly extending upper horizontal wall 49 overlying the lower wall 47. Disposing the lower wall 35 of the float lower box 31 in downward seating engagement upon the upper wall 49 of the bed frame channel members 46 would result in a very unstable condition since there is nothing to prevent lateral shift of the entire box spring and mattress on the float assemblies completely horizontally off of the bed frame side-rail upper wall 49.

From FIGURE 4 it is of course seen that no problem of this nature can occur with the angle type frame because of the presence of the bed frame vertical legs 24 in enclosing relationship to the lower box 31 of the floats. A stable support structure is provided for the channel frames as shown in FIGURE 6 by simply breaking out the knock-outs 37 in the side walls 36 of the float lower box 31 and sliding the floats onto the bed frame channel upper wall 49 in the manner illustrated so that the upper wall 49 projects into the slots in the float lower box side walls 36 formed by removal of the knock-outs 37, the lower box upper wall 34 being seated downward upon the upper wall 49 of the bed frame U-shaped channel member 46.

FIGURES 8 and 9 show an alternate form of float designated generally as 50 which is somewhat less expensive to make, but which is restricted in applicability to use with the L-shaped angle type frame designated generally in FIGURE 9 as 127 and having a vertical outer side wall 124. The hook type float 50 is generally L-shaped having a horizontal leg 51 and a vertical leg 52 extending upward from the horizontal leg and terminating in an outwardly and downwardly turned detenting hook 53. A vertically acting compression spring 54 is fixedly secured to the horizontal leg 51, and a horziontally acting compression spring 55 is fixedly secured to the vertical leg 52.

The hook float 50 is installed simply by lifting the box spring 121 and slipping the hook float over the side-rail so that the vertical leg 52 of the hook float is disposed flatwise on the inside face of the vertically extending leg 124 of the siderail 127 with the hook 53 of the hook float 50 locked over the upper edge of the side-rail. The length of the vertical leg 52 of the hook float 50 is preferably shorter than the vertical extent of the leg 24 of the bed frame side-rail 127 so that the horizontal leg 51 of the hook float does not quite seat downward upon the horizontal leg of the side rail. This insures that the hook 53 physically engages with and locks to the bed frame siderail when the box spring 121 is seated downward on the spring 54. The horizontal compression springs 55 prevent side locking of the box spring by maintaining the latter spaced away from the bed frame side-rail.

The aforedescribed float structure vibrationally isolate the box spring and mattress from the bed frame so that the vibratory movement of the box spring and mattress is not transmitted to the bed frame, and consequently is not transmitted into and through the floor and walls of the room in which the bed is located. The portion of the apparatus which sets the box spring and mattress into vibratory movement is shown in FIGURE 1 as including a control console 56 having control buttons 57 by means of which electrical energy drawn from a source of power via power cord 58 is selectively controlled in magnitude and delivered through electrical conductor 59 to the vibrator assembly designated generally as 60 and which is illustrated as clamped to the lower left side of box spring 21. The vibrator assembly 60 is best illustrated in the showings of FIGURES 10, 11 and 12 to which attention should be now directed.

The vibrator assembly 60 is seen to include a three part combination motor housing and clamp device consisting of the main housing 61 which carries a fixed clamping jaw 62, a movable clamping jaw 63, and a bolt 64 operable for shifting the movable clamping jaw 63 toward and away from the fixed clamping jaw 62; an electric motor 65; and an eccentric weight 66 secured to the rotor shaft of the motor 65 by means of the set screw 67. The main housing 61 is formed with an upper planar surface 68 which extends rearward from the fixed clamping jaw 62, the latter having its inner planar clamping face disposed at an approximate right angle to and extending upward from the upper planar surface 68. The planar surface 68 is formed with a pair of parallel extending opposite side marginal edges 69 which form a pair of tracks operative to hold the movable clamping jaw 63 to the main housing 61 and guide the movement of the movable jaw toward and away from the fixed clamping jaw 62.

The side edges 69 terminate short of the fixed clamping jaw 62 in the forward direction, and also terminate short of the plane of the rear wall 70. The front to rear clearance distances in front of and behind the front and rear terminating points of the side edges 69 are wider than the front to rear dimension of the movable clamping jaw 63 so that this jaw can be run off of the tracks provided by the side edges 69. As best seen from FIGURE 11, when the movable clamping jaw 63 is not restrained at its opposite side edges by the tracks provided by the main housing side edges 69, the movable clamping jaw 63 may be moved upward out of the captive engagement with the washer 71 held loosely captive on the front end of the bolt 64. The movable clamping jaw 63 is of course assembled to the main housing by carrying out precisely the reverse operation. Opening and closing of the clamping jaws is effected by screw advance and retreat of the bolt 64 by virtue of its threaded engagement through the rear wall 70 of the main housing 61.

The fixed clamping jaw 62 is provided with a pair of short piercing points 72 extending rearward from its clamping surface, and the movable clamping jaw 63 is provided with a pair of piercing points 73 projecting forward from the clamping face. As best seen from FIGURES 1, 2 and 11, the vibrator assembly is clamped to the wooden box spring base 42 by projecting the main housing 61 upward from below with the fixed clamping jaw 62 against the outer or visible side edge of the box spring and with the movable clamping jaw 63 inward of the wood framing of the box spring base 42, the housing 61 being projected upward until the upper planar surface 68 is flush against the underside of the box spring base. Rotation of the bolt 64 drives the movable clamping jaw 63 toward the fixed clamping jaw 62 to effect rigid clamping of the main housing 61 to the box spring base 42.

Extending downward and integrally formed as a part of the main housing 61 is a cylindrical chamber 74, and extending downward therefrom is a second chamber 75 within which is disposed the electric motor 65, the chambers 74 and 75 being partialy separated from one another by the intervening centrally open wall 76. The electric motor 65 is projected upward into the chamber 75 and secured to the wall 76 by means of a number of bolt and nut fastenings 77 with the rotor shaft 78 extending freely upward into the chamber 74. An annular washer 79 is disposed between the upper end of the housing of motor 65 and the underside of wall 76 to prevent vibration of the motor with respect to the housing. The eccentric weight 66 fixedly secured upon the rotor shaft 78 rotates in a horizontal plane within the chamber 74 when the motor 65 is energized by the control console 56 via electrical conductors 59.

The wall of upper cylindrical chamber 74 is of enlarged diameter adjacent the upper edge to provide a shoulder 80 upon which a cover disc 81 can be secured as by a press fit or adhesive securement to close the top of chamber 74. The outer lower peripheral edge of motor chamber 75 is formed with a reduced diameter to provide a shoulder 82 upon which a bottom cover may be snapfitted if desired to thereby completely enclose the motor 65.

In operation it will be appreciated that quite a number of variable factors are involved which will affect the operation of the system according to the invention, both as to the type and amplitude of vibrations which may be imparted to the box spring and mattress by the vibrator assembly 60 on the one hand, and the degree of vibration isolation and character of suspension provided by the floats 30 on the other hand. These factors are themselves determined in large measure by the type of box spring and mattress with which the system is to be used and the range of weights which may reasonably be expected to be placed upon the mattress.

Box spring and mattress combinations can vary between very firm box springs and mattresses including a very strong and rigid box spring base 42, to very soft or spongy types of box springs and mattresses combined with a relatively weak or flexible box spring base 42. The very firm structures may be characterized in terms of vibration transmission as tightly coupled systems, whereas the very soft and spongy combinations may be characterized as loosely coupled systems. The tightly coupled systems are excellent vibration transmission combinations for a wide range of vibration frequencies and amplitudes, while the loosely coupled systems exhibit a decoupling characteristic with vibration frequencies and amplitudes below a determinable range and also at frequencies and amplitudes above a determinable range.

This decoupling effect is actually a substantial decoupling of the movements of the box spring from those of the mattress. That is, while the box spring base 42 may be in vibration, such a vibration is transmitted through the box spring and mattress in a greatly attenuated form. It has been found however that the wider useful vibration transmission range of the tightly coupled systems includes within its limits the somewhat more restricted range of the useful vibrations of the loosely coupled systems. Accordingly, it has been found that a vibration system according to our invention is applicable to tightly coupled and loosely coupled spring and mattress combinations as well as all degrees of coupling between these extremes.

Vibration transmission into the box spring and mattress is also affected by the resilience of the float suspension system, which of course is determined by the characteristics of the resilient supports 33 of the floats 30. These resilient supports 33 are placed in vertical compression by the weight of the box spring and mattress and the occupants of the bed, and a proper selection is required to insure that over-compression does not occur because such will destroy the resilience of the suspension. Similarly, if too stiff a characteristic is incorporated into the supports 33 then the spring and mattress vibrating system will be insufficiently decoupled from the bed frame.

It has been found that excellent overall results are achievable when the resilient supports 33 are made in the form of a cylinder of forty durometer rubber approximately 1¼" high and 1¼" in diameter, and with four floats 30 being utilized to provide a four point stable suspension, each float being located along the sides about 12" from the end of the box spring. Occassionally, a box spring having a very weak base is encountered, and in such case it may be found desirable to utilize an additional float 30 on each side of the box spring at substantially the longitudinal center. The resilient rubber supports 33 of the floats 30 while preferably of forty durometer rubber as described, may be made from rubbers as low as thirty durometer and as high as fifty durometer provided that the cross-section and height are properly altered to maintain the proper condition of resilience and support when subjected to compressional loads up to four hundred pounds.

Placement of the floats substantially closer to the corners of the box spring tends to stiffen the suspension and reduce vertical components of vibration which are generated in the manner to be described. Placement of the floats substantially closer toward the center of the side of the box spring leads to mechanical instability of the box spring and mattress should someone sit on the end of the bed. Moreover, it alters the vibration characteristics by placing the vibrator assembly 60 too close to the foot-end float.

Physical placement of the vibrator assembly 60 is quite important in terms of the type of vibration condition which is set up. Placement of the vibrator along the longitudinal center line of the box spring at either the foot end or head end has been found to be generally undesirable because it produces a large component of vibration transmission into the head and shoulders of an occupant of the bed, and this is not what is usually desired in normal usage. Clamping of the vibrator assembly 60 to the side of the box spring has been found to be optimized in the region from approximately 18" to 30" from the foot end of the box spring, with the best location being usually about 23" from the box spring foot end.

Positioning of the vibrator assembly further toward the head end of the box spring reduces the effect felt in the legs and increases that felt in the thoracic region, while positioning the vibrator assembly closer to the foot end increases the vibration felt in the legs and decreases that felt in the upper regions of the body. Placement of the vibrator assembly as indicated produces the best overall effect. Moreover, motional components are induced into the box spring and mattress having vibrational components in both the horizontal and vertical planes. These motion components are set up in the following way.

As is observed from the showings of FIGURES 10, 11 and 12, the motor 65 and eccentric weight 66 are oriented so that the eccentric weight is rotated in a horizontal plane. This horizontal rotary movement of the eccentric weight 66 is transmitted through the main housing of the vibrator assembly to the box spring and causes the latter to oscillate with a rotary motion in the horizontal plane. As the box spring 21 starts to move horizontally, the upper ends of the resilient supports 33 of the floats 30 move with it while the lower ends of the resilient supports remain motionless. The resilient supports 33 are thus shortened vertically so that the box spring and mattress in effect move downward for a distance while also moving laterally thereby inducing a vertical component of motion into the box spring and mattress.

Due to the resilient nature of the supports 33 a counter-directed restoring force is set-up in the supports tending to move the box spring and mattress back toward its original position. This restoring force is also aided by the fact that the rotating eccentric weight 66 moves on to another position opposite to that which caused the initial deflection. The circular symmetry of the resilient supports 33 favors the aforegoing described action regardless of the position of the box spring or mattress at any given instant. Consequently, the horizontal oscillating motion of the box spring and mattress is elliptical or circular in nature while a vertical oscillating component is also introduced.

Various different types of vibratory action are induced into the box spring and mattress by rotating the eccentric weight 66 at different rotative speeds, quite a marked variation in effect occurring within the range between approximately 350 r.p.m. and 1,000 r.p.m. At the low-speed end of the range, the induced vibrations are predominately those of the horizontal component of motion while at the high-speed end of the range the vibrations contain a much stronger vertical component. In the intermediate speed ranges a more balanced combination of vibrations appears to exist. Finally, apparently due to the asymmetry of location of the vibrator assembly 60 with respect to the suspension system, the vibrations set up in the box spring and mattress are variable and controllable by controlling the rotational speed of the eccentric weight 66. It has been found that at the lower speed ranges a more vigorous vibration effect appears to occur toward the foot end of the mattress in the region of the leg calves of an occupant of the bed, and that this more pronounced vibrational effect can be caused to move upward toward and into the buttock region and thence to the lower back by progressively increasing the rotational speed of the eccentric weight.

Because of the mass which is being moved, namely, the entire box spring and mattress as well as the occupants of the bed, a motor of reasonable horsepower is required to rotate the eccentric weight, which latter is of substantial mass and eccentricity by comparison with previously known vibrating type devices. It has been found that a mass of two to three ounces at a distance of substantially 2" from the center of rotation produces optimum results and may be driven through the useful range by a ⅟₁₀₀ of a horsepower motor. The motor may suitably be a four pole shaded pole induction motor having a no load speed on the order of 1500 r.p.m.

In any application where the suspension system is likely to be subjected to a high impact force applied laterally through the box spring and mattress it may be desirable to provide a support system positively locked to the bed frame. Such a support is shown in FIGURES 13 and 14 which illustrates a modified form of lower box 31 designated generally as 31' having an upper wall 34', a lower wall 35' and a pair of opposite side walls 36'.

Extending downward and forward beneath the lower wall 35' is a detenting clamping flange 83 through which are upwardly threadedly projected a pair of wing bolts 84 operative to engage the undersurface of the horizontal bed frame side rail support designated as 49–23 to illustrate that this may be either the upper wall 49 of the channel type side rail or the horizontal leg 23 of the angle type side rail, all as previously described. The lower wall 35' of the float lower box 31' is provided with a pair of apertures 85 aligned with the wing bolts 84 and larger in diameter than the latter. For use with a slat bed a longer wing bolt may be used to clamp the underside of the slat 45' shown in dotted outline.

What is claimed to be new and useful is:

1. A vibration inducing system for use in combination with a bed having a bed frame, a substantially rigid mattress support having a head and a foot end and normally carried by the bed frame in direct fixed mechanical engagement, and a mattress carried by the mattress support, said vibration inducing apparatus comprising in combination, a plurality of resilient support means each of which is characterized by more than one degree of substantial motional freedom, said resilient support means being interposable between and mechanically engageable with the mattress support and bed frame and operative when so interposed to resiliently support the mattress support from the bed frame, and selectively actuatable vibratory means rigidly securable to the mattress support and operative when so secured and actuated to impart planar oscillatory motion to the mattress support by deforming said resilient support means and thereby simultaneously induce oscillatory motion into the mattress support in a direction oriented transversely to the plane of said planar oscillatory motion through the resilient action of said resilient support means.

2. A vibration inducing system as defined in claim 1 wherein said vibratory means comprises a motor having a shaft rotatable about an axis substantially orthogonal to the plane of the mattress support, and a vibration inducing mass fixedly secured eccentrically to said shaft for rotation therewith in a plane parallel to the plane of the mattress support to thereby impart planar oscillatory motion to the mattress support as aforesaid.

3. A vibration inducing system as defined in claim 2 wherein said vibratory means is secured to the mattress support at a point substantially displaced from the center of mass of the latter and substantially displaced from the center of support established by said resilient support means.

4. A vibration inducing system as defined in claim 1 wherein said vibratory means is secured to the mattress support at a point substantially displaced from the center of mass of the latter.

5. A vibration inducing system as defined in claim 1 wherein said vibratory means is secured to the mattress support at a point substantially displaced from the center of support established by said resilient support means.

6. A vibration inducing system as defined in claim 1 wherein said vibratory means is secured to the mattress support along one side edge of the latter and in the region between eighteen and thirty inches from the foot end thereof.

7. A vibration inducing system as defined in claim 1 wherein said plurality of resilient support means comprises four such means spaced apart from one another in a generally rectangular array to provide a four point suspension system with the points of suspension lying substantially at the perimeter of and end-spaced inward from the head and afoot ends of the mattress support along opposite sides thereof, at least a portion of each said resilient support means having limited two dimensional motional freedom in a substantially horizontal plane and limited motional freedom in a substantially vertical direction.

8. A vibration inducing system as defined in claim 7 wherein each of said plurality of resilient support means comprises a base portion including detenting means for mechanically engaging the bed frame, an upper anchor element including anchoring means for mechanically engaging the mattress support, and a resilient column extending between and secured to each of said base and upper anchor element.

9. A vibration inducing system as defined in claim 7 wherein said resilient support means are endspaced inward for a distance between ten and fifteen inches from the head and foot ends of the mattress support.

10. A vibration inducing system as defined in claim 7 wherein said resilient support means are endspaced inward for a distance between ten and fifteen inches from the head and foot ends of the mattress support, and wherein said vibratory means is secured to the mattress support along one side edge of the latter and in the region between eighteen and thirty inches from the foot end thereof.

11. A vibration inducing system as defined in claim 8 wherein said resilient column of each said resilient support means is a column of rubbber in the range of thirty durometer to fifty durometer of sufficient cross-section and height to maintain resilience and support when subjected to compressional loads up to four hundred pounds.

12. A vibration inducing system as defined in claim 8 wherein said resilient support means base portion comprises a substantially rigid box having spaced apart top and bottom walls and opposite side walls, said detenting means comprising at least one detenting finger turned out of the said box bottom wall, and said resilient column being secured at its lower end to said box top wall and extending upward to said upper anchor element.

13. A vibration inducing system as defined in claim 10 wherein said resilient column of each said resilient support means is a column of rubber in the range of thirty durometer to fifty durometer of sufficient cross-section and height to maintain resilience and support when subjected to compressional loads up to four hundred pounds.

14. A vibration inducing system as defined in claim 2 wherein said vibratory means further includes a rigid combination vise-type clamping device and motor housing extending downward therefrom, said clamping device being operative to clamp to the bottom perimeter of a mattress support of the box spring type having a bottom perimetral frame with the said clamping device and motor housing extending inward immediately beneath the box spring and adjacent to the edge thereof.

15. The method of relaxing muscles and stimulating bodily blood circulation by inducing vibrations in the body of an occupant of a bed of the type having a bed frame, a substantially rigid mattress support having a head end and a foot end and normally carried by the bed frame in direct mechanical engagement, and a mattress carried by the mattress support, consisting of the steps of, disengaging the mattress support from the bed frame and resiliently supporting the mattress support at four points spaced apart from one another in a generally rectangular disposition so that the mattress support has limited freedom of movement in any direction in a plane substantially parallel to the plane of the mattress support and also has similar limited freedom of movement in a direction perpendicular to the plane of the mattress support, applying to the mattress support a force moving circularly in a plane parallel to the plane of the mattress support to thereby similarly move the mattress support, and simultaneously transmitting to the mattress support a force causing the latter to also move perpendicularly to its plane.

16. The method as described in claim 15 wherein the said circularly moving force is applied to the mattress support at a point substantially displaced from the center of mass of the latter.

17. The method as described in claim 15 wherein the said circularly moving force is applied to the mattress support at a point along one side edge of the latter closer to the foot end than to the head end thereof.

18. The method as described in claim 15 wherein the resilient support is applied to the mattress support at points lying substantially at the perimeter of and end-spaced inward from the head and foot ends of the mattress support along opposite sides thereof.

19. The method as described in claim 18 wherein the said circularly moving force is applied to the mattress support at a point along one side edge of the latter closer to the foot end than to the head end thereof and between the two points of resilient support along that side of the mattress support.

20. A vibration inducing system as defined in claim 8 wherein said detenting means of said resilient support means base portion comprises clamping means operative to detachably positively lock said base portion to the bed frame.

21. A vibration inducing system for inducing vibrations in a body to stimulate blood circulation and relax muscles of the body, comprising in combination, a body support including a substantially rigid member carried by an underlying support structure, a plurality of resilient support means each of which is characterized by more than one degree of substantial motional freedom, said resilient support means being interposed between said body support and said underlying support structure to thereby resiliently support said body support from said support structure, and selectively actuatable vibratory means mechanically tightly coupled to said substantially rigid member and operative when actuated to impart planar oscillatory motion to said body support by deforming said resilient support means and thereby simultaneously inducing oscillatory motion into said body support in a direction oriented transversely to the plane of said planar oscillatory motion through the resilient action of said resilient support means.

References Cited

UNITED STATES PATENTS

| | | | |
|---|---|---|---|
| 761,862 | 6/1904 | Wallman et al. | 128—33 |
| 1,017,840 | 2/1912 | Amet | 128—33 |
| 2,157,064 | 5/1939 | Wunderlich | 5—309 XR |
| 2,668,530 | 2/1954 | Tackaberry | 128—33 |
| 2,814,052 | 11/1957 | Kaiser | 5—210 |
| 3,035,572 | 5/1962 | Houghtaling | 128—33 |

L. W. TRAPP, Primary Examiner